US012559004B2

(12) United States Patent
Wei et al.

(10) Patent No.: US 12,559,004 B2
(45) Date of Patent: Feb. 24, 2026

(54) FOLDABLE BACKSEAT

(71) Applicant: Anhui Hepai Special Vehicle Manufacturing Co., Ltd., Huaibei (CN)

(72) Inventors: Jiangao Wei, Hechi (CN); Xiaomin Xie, Zhaoqing (CN)

(73) Assignee: Anhui Hepai Special Vehicle Manufacturing Co., Ltd., Huaibei (CN)

( * ) Notice: Subject to any disclaimer, the term of this patent is extended or adjusted under 35 U.S.C. 154(b) by 0 days.

(21) Appl. No.: 19/263,485

(22) Filed: Jul. 9, 2025

(65) Prior Publication Data

US 2025/0332968 A1     Oct. 30, 2025

(51) Int. Cl.
| | |
|---|---|
| *B60N 2/36* | (2006.01) |
| *B60N 2/005* | (2006.01) |
| *B60N 2/30* | (2006.01) |
| *B60N 2/64* | (2006.01) |
| *B60N 2/75* | (2018.01) |

(52) U.S. Cl.
CPC .............. B60N 2/36 (2013.01); B60N 2/005 (2013.01); B60N 2/3045 (2013.01); *B60N 2/64* (2013.01); *B60N 2/75* (2018.02); *B60N 2205/30* (2013.01)

(58) Field of Classification Search
CPC ... B60N 2/24; B60N 2/32; B60N 2/36; B60N 2/64; B60N 2/75; B60N 2205/30; B60N 2205/005; B60N 2205/015; B60N 2205/20; B60N 2205/206

USPC ...... 296/64, 69, 26.08, 65.16; 297/118, 129, 297/354.1
See application file for complete search history.

(56) References Cited

U.S. PATENT DOCUMENTS

| | | | | |
|---|---|---|---|---|
| 5,575,449 | A * | 11/1996 | Shinbori | B60N 2/0715 |
| | | | | 297/344.1 |
| 6,039,227 | A * | 3/2000 | Stark | B60R 9/08 |
| | | | | 224/531 |
| 6,837,531 | B2 * | 1/2005 | Mack | B60N 2/3015 |
| | | | | 297/188.1 |
| 10,195,968 | B2 * | 2/2019 | Barnes | B60N 2/3095 |

FOREIGN PATENT DOCUMENTS

CN          201566521 U   *   9/2010   .............. B60N 2/24

OTHER PUBLICATIONS

CN 201566521 Text (Year: 2010).*

* cited by examiner

*Primary Examiner* — Dennis H Pedder
(74) *Attorney, Agent, or Firm* — All West Law Group PLLC; Aaron Powell

(57) ABSTRACT

A foldable backseat includes a base plate and a turnover plate. The turnover plate is movably connected to the base plate. With an external force, the turnover plate can be turned over to overlap with the base plate or turned over to be at a same level as the base plate to form a storage platform. The foldable backseat can be folded to form a seat for a caddy to rest or unfolded to form a storage platform for transporting goods, so as to meet the needs of different scenarios.

8 Claims, 9 Drawing Sheets

FOLDABLE BACKSEAT

TECHNICAL FIELD

The invention belongs to the technical field of automobiles and particularly relates to a foldable backseat applied to a golf cart.

TECHNICAL BACKGROUND

In golf activities, a caddy needs to take a golf cart for a long time to provide services to players. It is a very labor-intensive job. The rear end of the existing golf cart is only designed as a goods storage area without seats for the caddy to sit down or rest. As a result, the caddy cannot get effective rest in time during working time, which easily leads to fatigue.

INVENTION CONTENT

In order to overcome the deficiencies of the prior art, the present invention provides a foldable backseat, which can be folded to form a seat for the caddy to rest, and can also be unfolded to form a storage platform for transporting goods. Therefore, the foldable backseat of the present invention can meet the needs of different scenarios.

The technical scheme adopted by the present invention for solving technical problems is as follows:

A foldable backseat includes a base plate and a turnover plate, and the turnover plate is movably connected to the base plate. And with an external force, the turnover plate can be turned over to overlap with the base plate or turned over to be at the same level as the base plate to form a storage platform.

Further, a storage box is arranged below the base plate. An opening is arranged at the top end of the storage box, the opening is covered by a top cover plate, and the top cover plate can be in a closed state or an open state.

Further, the foldable backseat also includes a supporting frame. The base plate is fixed on the supporting frame. The supporting frame is provided with a first mounting frame. The supporting frame can be fixedly installed on the rear end of the golf cart through the first mounting frame.

Further, a seat belt buckle is arranged on the supporting frame. A through hole for the seat belt buckle to pass through is arranged on the base plate. The seat belt buckle is exposed on the base plate.

Further, one side of the turnover plate is provided with anti-slip textures, and the other side of the turnover plate is provided with a soft cushion. The surface of the base plate is also provided with anti-slip textures.

Further, two side armrests are arranged on the two sides of the turnover plate, and the two side armrests are perpendicular to the turnover plate. When the turnover plate is turned over to overlap with the base plate, the two side armrests are respectively vertically arranged on the two sides of the turnover plate.

Further, the foldable backseat also includes a backrest, which is arranged above the base plate. One side of the backrest is provided with a soft back cushion, and the other side of the backrest is provided with a second mounting frame.

Further, the foldable backseat also includes a pedal parallel to the base plate, and the pedal is connected to the base plate through a supporting column.

Further, a front armrest is arranged on one side of the pedal away from the base plate. One end of the turnover plate is used as a connection side to be connected with the base plate, and the other end of the turnover plate is used as a turnover side. A groove is arranged on the turnover side, and the groove can be clamped with the front armrest.

Further, a tow hitch for a trailer is arranged at the bottom end of the front armrest.

The beneficial effects of the present invention:

The present invention is fixed to the rear end of the golf cart through the first mounting frame and the second mounting frame, which makes full use of the rear space and improves space utilization. The foldable backseat of the present invention can be folded to form a seat for the caddy to rest and can also be unfolded to form a storage platform for transporting goods to meet the needs of different scenarios. Thus, the foldable backseat of the present invention has strong practicality.

DESCRIPTION OF MARKS IN FIGURES

Figure 1:
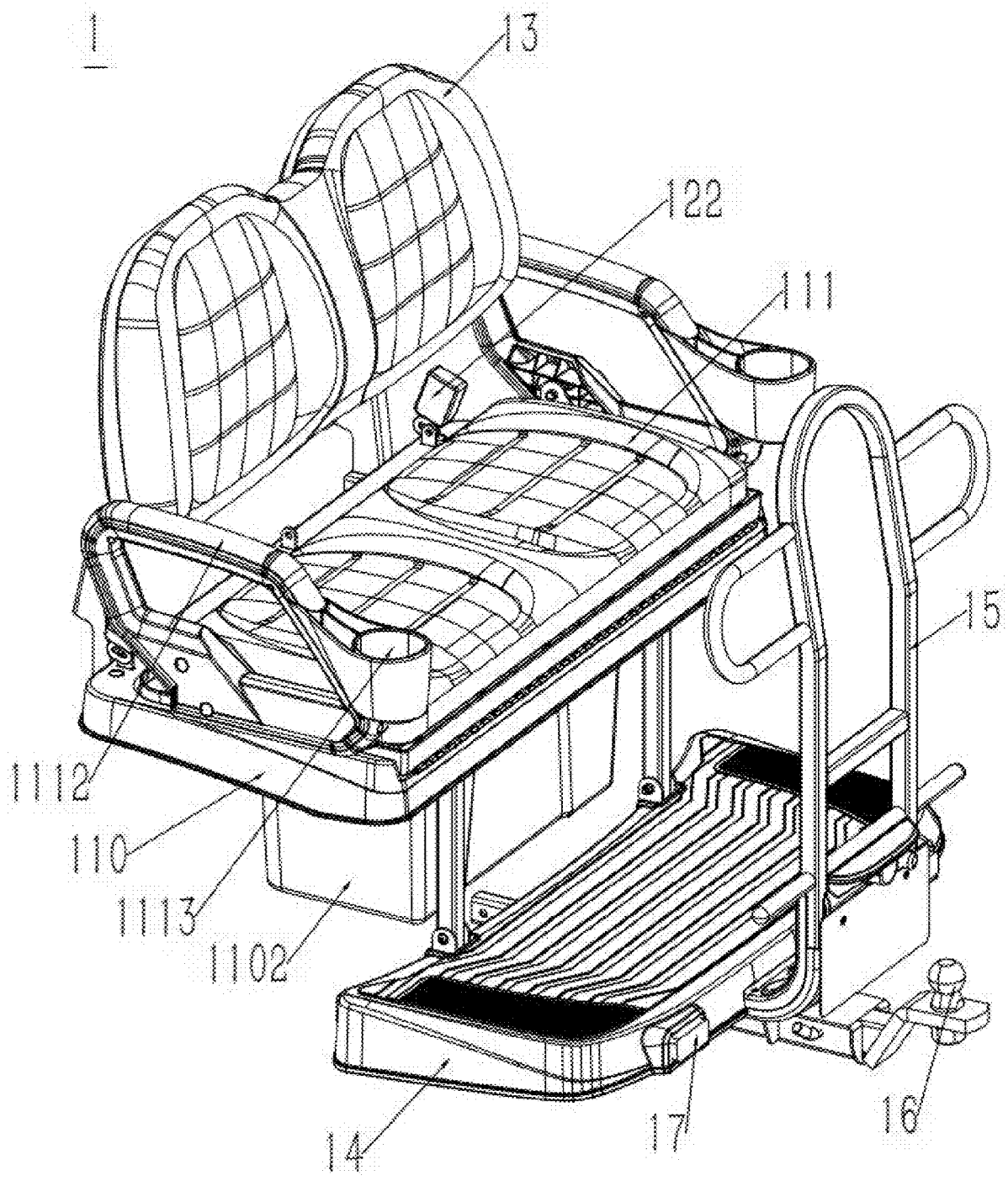
FIG. 1 is a schematic view of a foldable backseat of the present invention in a folded state.
Figure 2:
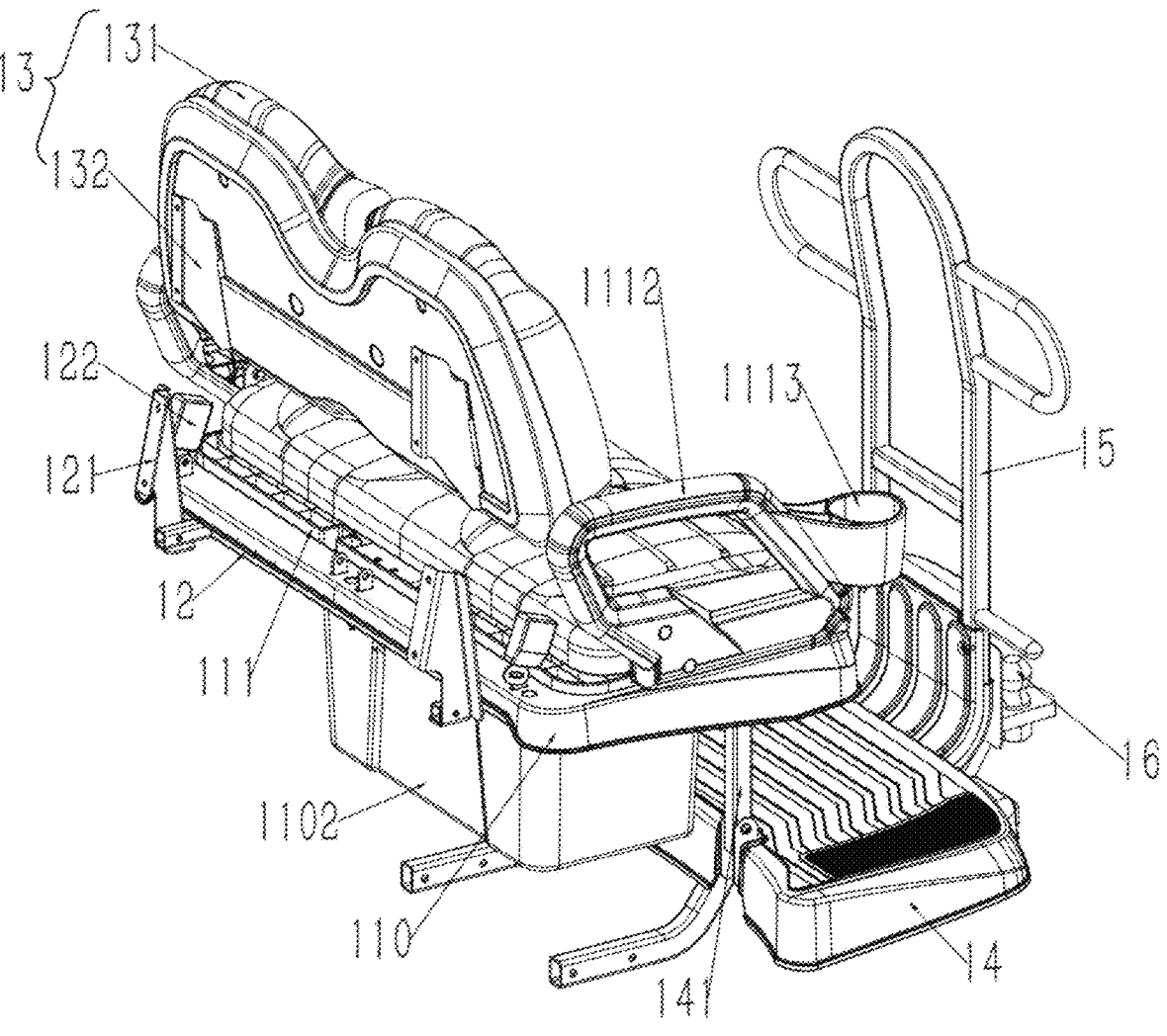
FIG. 2 is a schematic view of the foldable backseat of the present invention in a folded state from another angle.
Figure 3:
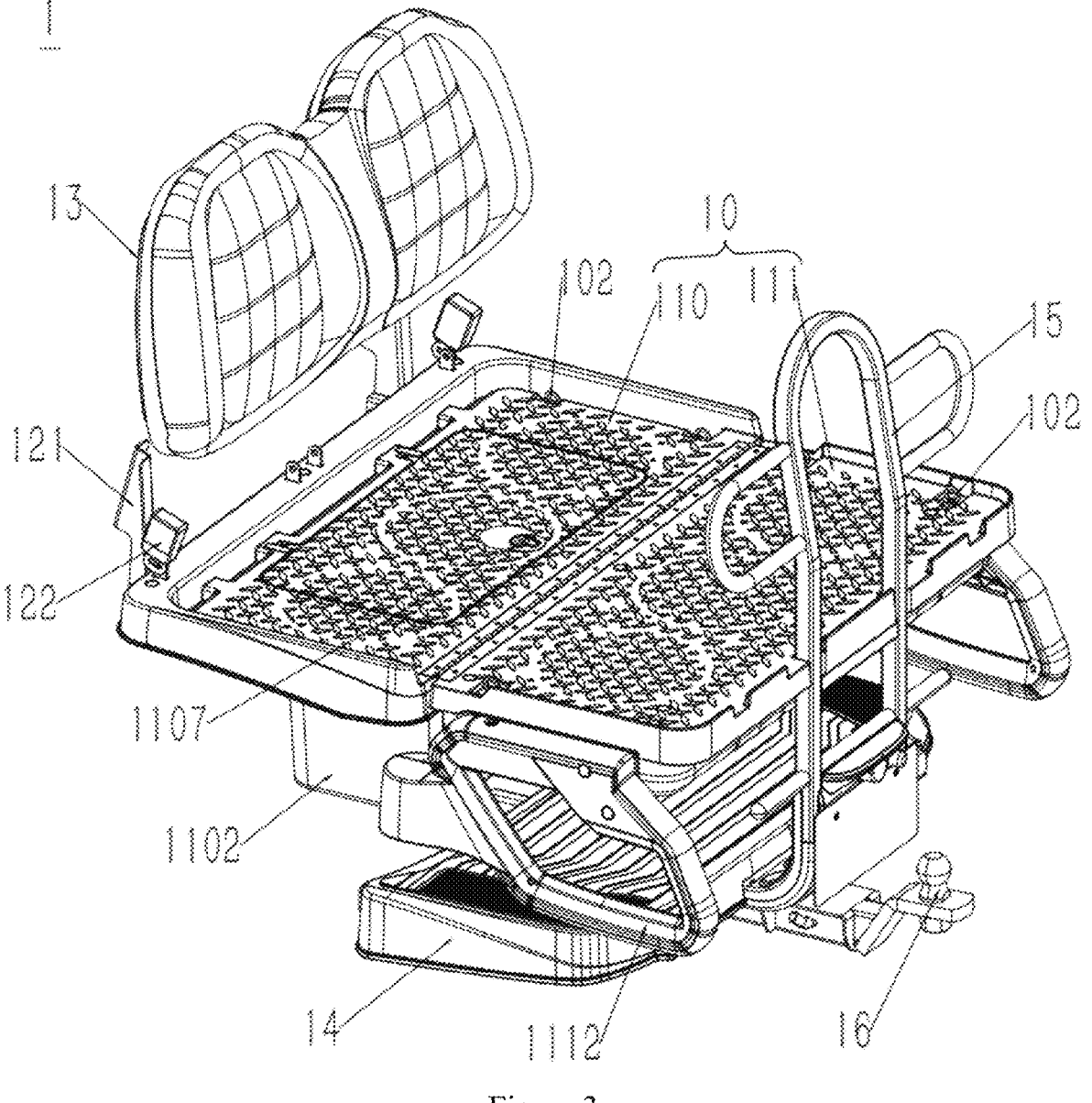
FIG. 3 is a schematic view of the foldable backseat of the present invention in an unfolded state.
Figure 4:
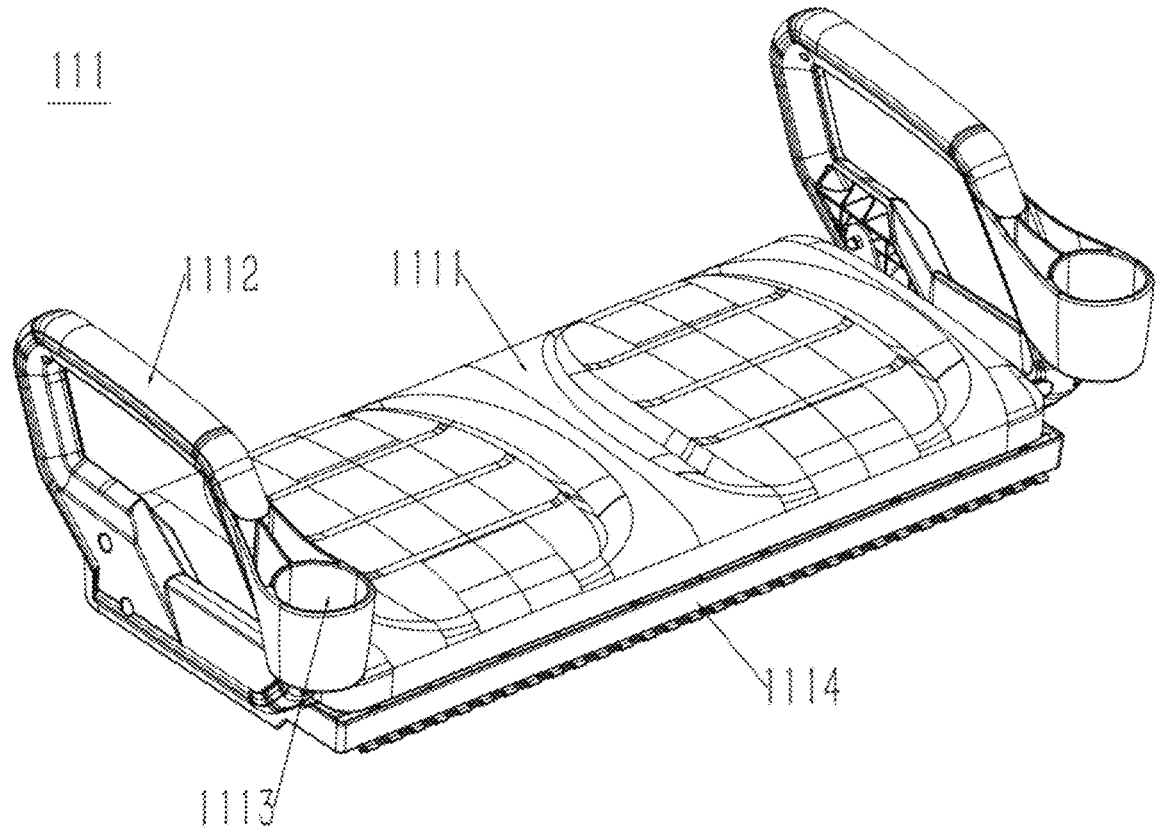
FIG. 4 is a schematic view of a turnover plate of the present invention.
Figure 5:
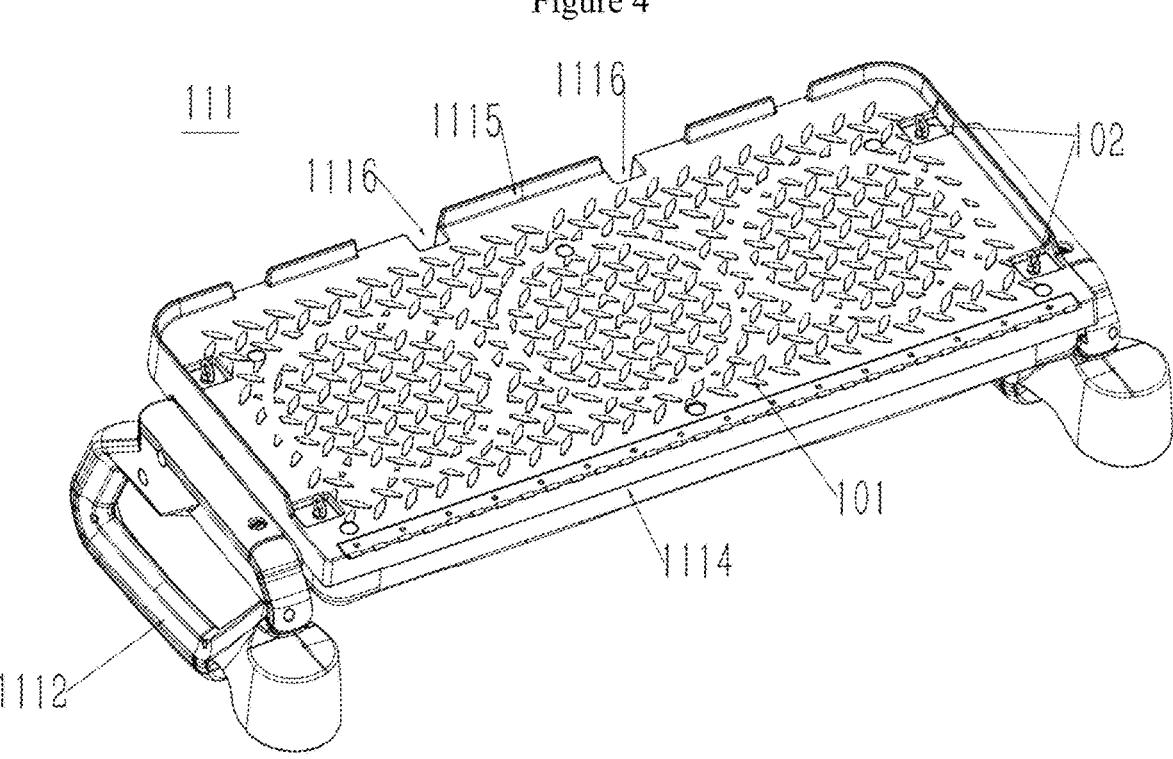
FIG. 5 is a schematic view of the turnover plate of the present invention from another angle.
Figure 6:
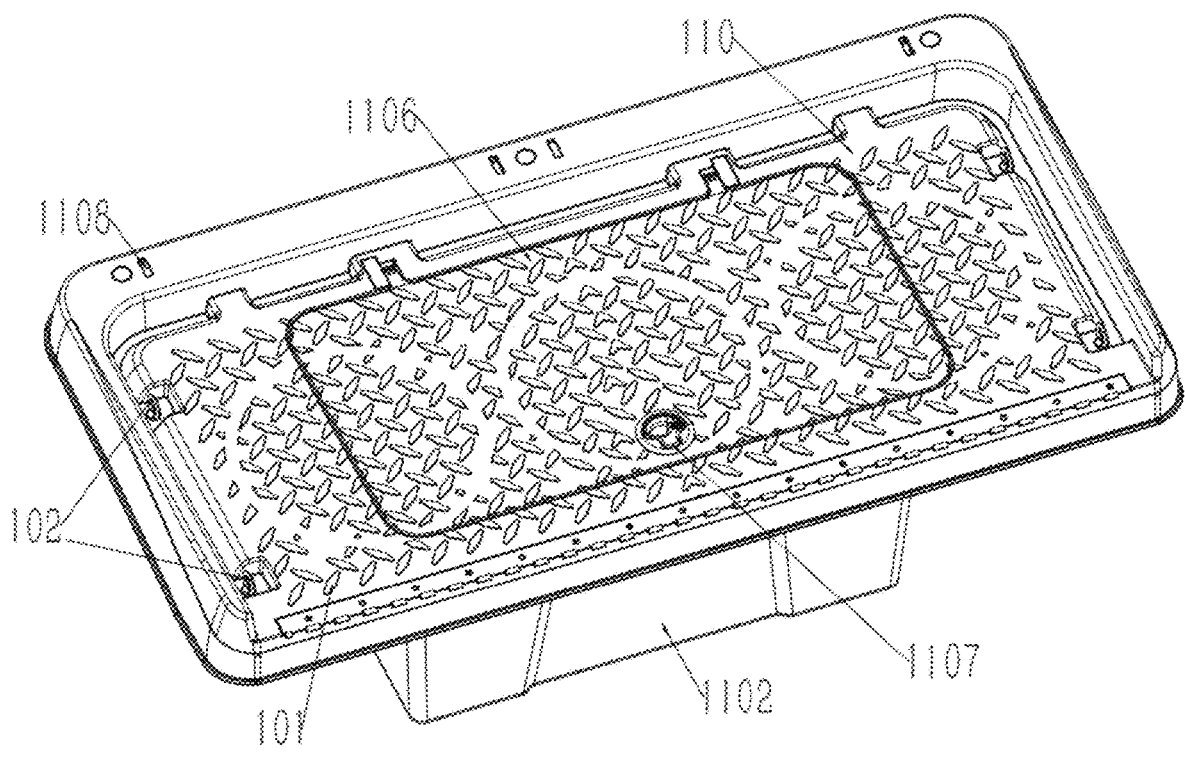
FIG. 6 is a schematic view of a base plate of the present invention.
Figure 7:
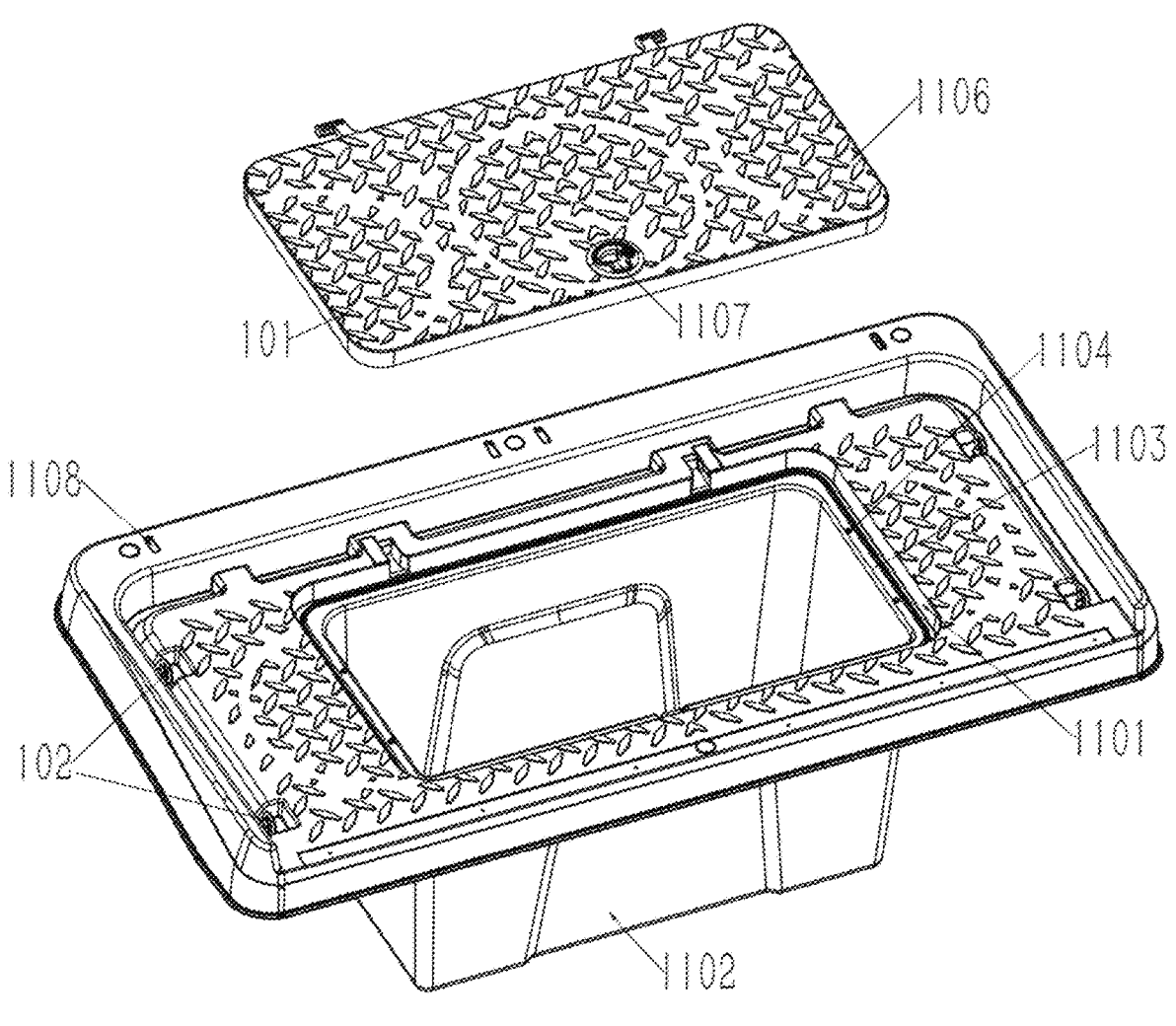
FIG. 7 is an exploded view of the base plate of the present invention.
Figure 8:
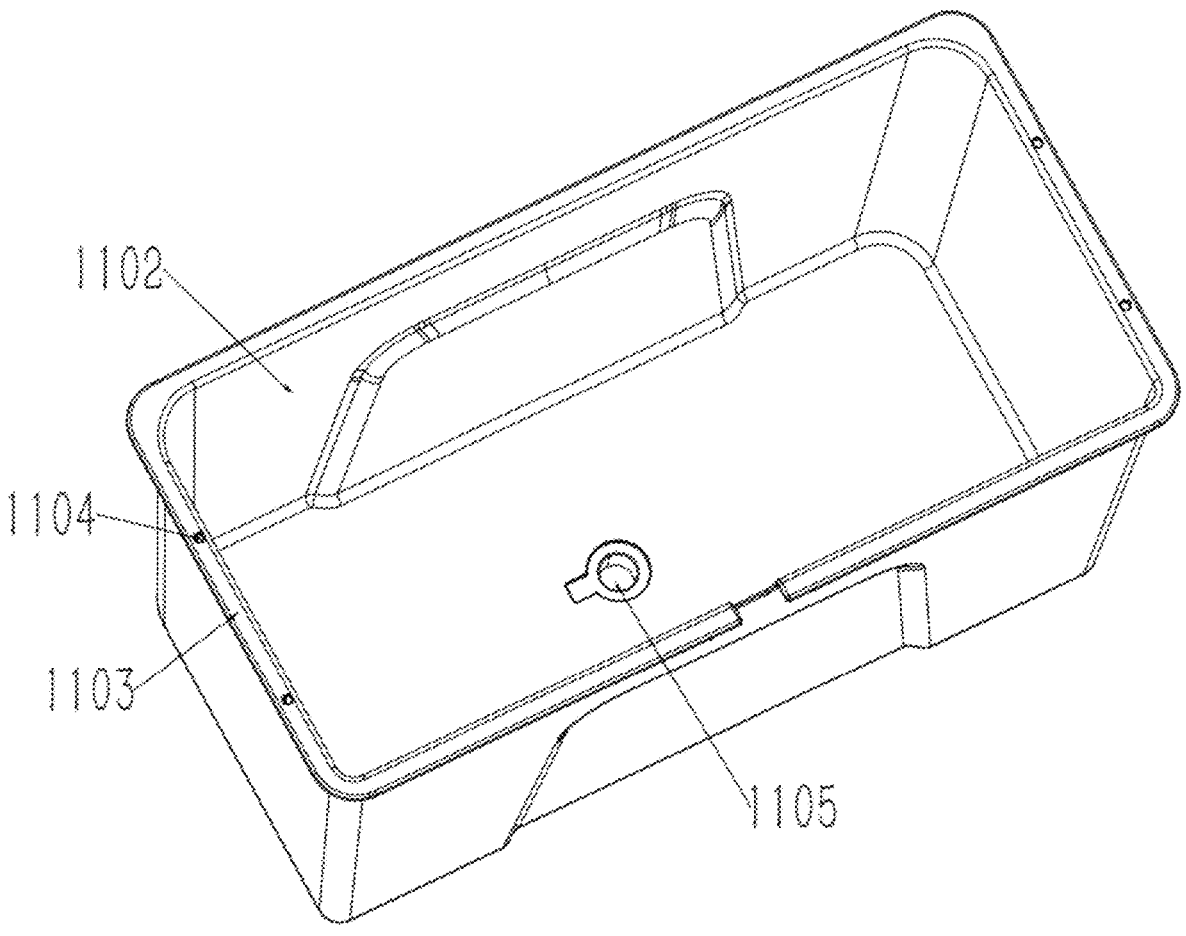
FIG. 8 is a schematic view of a storage box of the present invention.

1—foldable backseat; 10—storage platform; 101—anti-slip texture; 102—fastening ring; 110—base plate; 1101—installation slot; 1102—storage box; 1103—step; 1104—installation hole; 1105—water outlet; 1106—top cover plate; 1107—locking member; 1108—through hole; 111—turnover plate; 1111—soft cushion; 1112—side armrest; 1113—storage holder; 1114—connection side; 1115—turnover side; 1116—groove; 12—supporting frame; 121—first mounting frame; 122—seat belt buckle; 13—backrest; 131—soft back cushion; 132—second mounting frame; 14—pedal; 141—supporting column; 15—front armrest; 16—trailer tow ball; 17—lamp reflector; 2—golf cart.

DETAILED DESCRIPTION OF THE EMBODIMENTS

The present embodiment only shows an explanation of the present invention, and it is not a limitation to the present invention. The skilled in the art can make modifications to this embodiment as needed without making any creative contributions after reading this specification, which are always protected by the patent law as long as they are within the scope of the claims of the present invention.

The present invention provides a foldable backseat, which is mainly used in a golf cart. The foldable backseat can be folded to form a seat for the caddy to sit and rest and can also be unfolded to form a storage platform for fixing and transporting goods. Therefore, the foldable backseat of the present invention has strong practicality.

Referring to FIGS. 1 to 10, the foldable backseat 1 provided in this embodiment includes a base plate 110 and a turnover plate 111. The turnover plate 111 is movably connected to the base plate 110. With an external force, the turnover plate 111 can be turned over to overlap with the base plate 110 or turned over to be at the same level as the base plate 110 to form a storage platform 10.

A storage box 1102 is arranged below the central position of base plate 110. The top side of the storage box 1102 is provided with an opening, and the opening is covered by a top cover plate 1106. The top cover plate 1106 is hinged to the base plate 110 and can be in a closed state or an open state. The top cover plate 1106 and the base plate 110 are provided with a locking member 1107 that cooperates with each other to prevent theft. It should be particularly noted that the present invention does not limit the locking member 1107, and any member that can achieve the locking function can be applied here.

Specifically, an installation slot 1101 is arranged in the middle part of the base plate 110. Step 1103 is arranged on the opening of the storage box 1102. Step 1103 is overlapped on the bottom wall of the installation slot 1101, and a plurality of installation holes 1104 are arranged on step 1103. The storage box 1102 can be fixed to bottom ends of the plurality of installation slots 1101 by the cooperation of fastening pieces and the installation holes 1104.

A water outlet 1105 is arranged at the bottom end of the storage box 1102. The water outlet 1105 is used to solve the problem of water accumulation and water seepage in the storage box to ensure a dry storage environment.

The foldable backseat 1 also includes a supporting frame 12. A base plate 110 is fixed on the supporting frame 12. The supporting frame 12 is provided with a first mounting frame 121. The supporting frame 12 can be fixedly installed on the rear end of the golf cart 2 through the first mounting frame 121, so that the base plate 110 and the turnover plate 111 are arranged on the golf cart 2. And the turnover plate 111 is located on the side of the base plate 110 away from the first mounting frame 121, so that the foldable backseat 1 can be reversely arranged on the rear end of the golf cart 2.

One side of the turnover plate 111 is provided with anti-slip textures 101, and the other side of the turnover plate 111 is provided with a soft cushion 1111. The surface of the base plate 110 is also provided with anti-slip textures 101.

When the turnover plate 111 is turned over to overlap with the base plate 110, the turnover plate 111 is located directly above the base plate 110. And the soft cushion 1111 is located on the top surface of the turnover plate 111. The caddy can sit on the soft cushion 1111 to improve the riding comfort.

When the turnover plate 111 is turned over to form the storage platform 10 with the base plate 110, the side with anti-slip textures 101 of the turnover plate 111 and the surface with anti-slip textures 101 of the base plate 110 serve as the top surface of the storage platform 10. The anti-slip textures 101 increase friction and prevent goods from sliding during transportation.

A plurality of fastening rings 102 are arranged on the side of the turnover plate 111 with anti-slip textures 101, and a plurality of fastening rings 102 are also arranged on the surface of the base plate 110 with anti-slip textures 101. The goods are fixed to the fastening rings 102 by straps to prevent the goods from scattering or sliding during transportation, so as to ensure stable transportation.

The supporting frame 12 is provided with a seat belt buckle 122, and the base plate 110 is provided with a through hole 1108 for the seat belt buckle 122 to pass through. The seat belt buckle 122 is exposed on the base plate 110.

Understandably, the rear end of the golf cart 2 is provided with a seat belt. When the supporting frame 12 provided in this embodiment is installed on the rear end of the golf cart 2, the seat belt cooperates with the seat belt buckle 122. When the caddy sits on the backseat of the golf cart 2, the caddy fastens the seat belt and rides more safely.

Two side armrests 1112 are arranged on the two sides of the turnover plate 111, and the side armrests 1112 are perpendicular to the turnover plate 111. When the turnover plate 111 is turned over to overlap with the base plate 110, the side armrests 1112 are vertically arranged on the two sides of the turnover plate 111 to support the arms of the caddy. Two storage holders 1113 are respectively arranged at front sides of the two side armrests 1112, and the two storage holders 1113 can be used to store small items. When the turnover plate 111 is turned over to form a storage platform 10 with the base plate 110, the two side armrests 1112 are turned over along with the turnover plate 111 to two lower sides of the storage platform 10, so that the two side armrests 1112 will not block the user from placing goods on the storage platform 10.

The foldable backseat 1 also includes a backrest 13, which is arranged above the base plate 110. One side of the backrest 13 is provided with a soft back cushion 131, and the other side of the backrest 13 is provided with a second mounting frame 132. The backrest 13 can be fixedly installed on the rear end of the golf cart 2 through the second mounting frame 132. When the user sits on the turnover plate 111, the user can lean on the backrest 13 to increase comfort.

Figure 9:
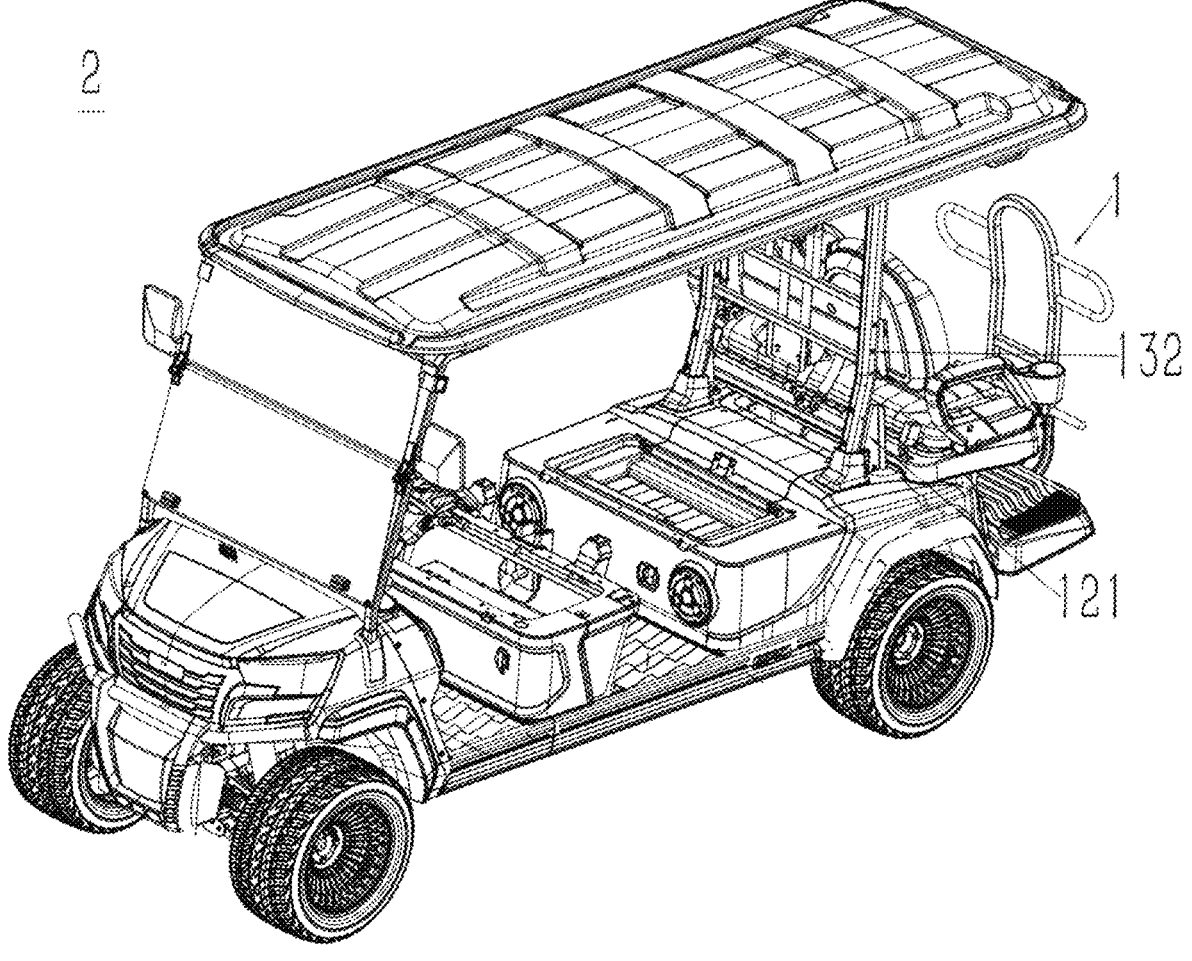
FIG. 9 is a schematic view of the foldable backseat of the present invention installed on a golf cart.
Figure 10:
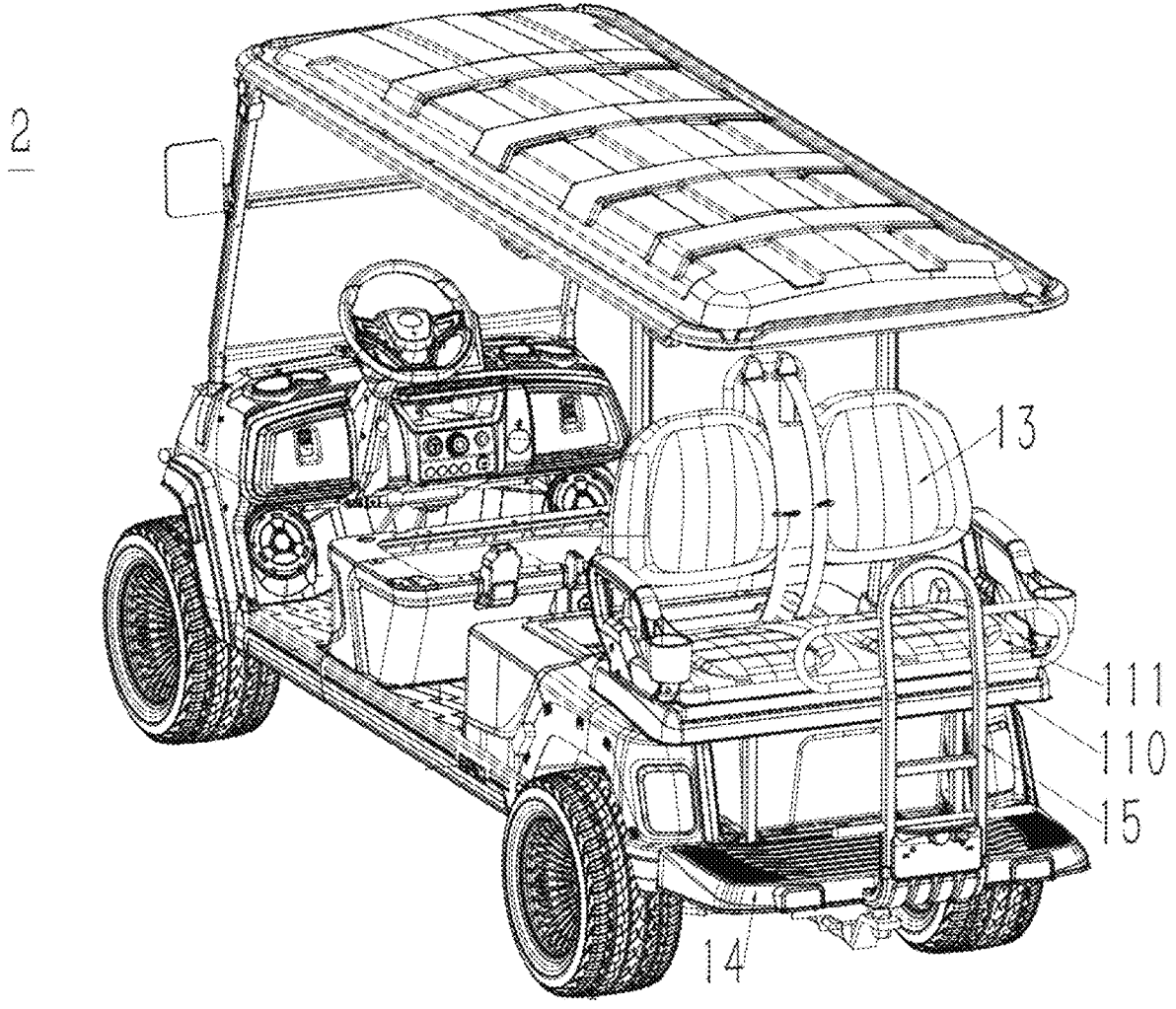
FIG. 10 is a schematic view of the foldable backseat of the present invention installed on a golf cart from another angle.

Referring to FIG. 9, which is a schematic view of the foldable backseat 1 in this embodiment applied to golf cart 2. The first mounting frame 121 and the second mounting frame 132 are fixedly connected to the golf cart body, which adopts a reverse structure design to fully utilize the space at the rear end of the golf cart 2. Therefore, the foldable backseat 1 of the present invention improves the space utilization rate of the rear end of the golf cart 2.

The foldable backseat 1 also includes a pedal 14, which is connected to the base plate 110 through the supporting column 141. Pedal 14 is parallel to base plate 110. The user can stand on the pedal 14 or sit on the soft cushion 1111 of the turnover plate 111 and put his feet on the pedal 14 to improve comfort.

A front armrest 15 is arranged on a side of the pedal 14 away from base plate 110. One end of the turnover plate 111 is used as a connection side 1114 to be connected with the base plate 110, and the other end of the turnover plate 111 is used as a turnover side 1115. A groove 1116 is arranged on the turnover side 1115, and the groove 1116 can be clamped with the front armrest 15.

When the turnover plate 111 is turned over to form a storage platform 10 with the base plate 110, the groove 1116 can be clamped with the front armrest 15 to fix the turnover plate 111. In addition, when the turnover plate 111 is turned over to overlap with the base plate 110, the caddy sitting on the soft cushion 1111 of the turnover plate 111 can grasp the front armrest 15.

A trailer tow ball 16 is arranged at the bottom end of the front armrest 15. When the golf cart 2 breaks down, the golf cart 2 can be connected to a trailer through the trailer tow ball 16, and the trailer can drag the golf cart 2 to move.

Two lamp reflectors 17 are arranged on one side of the pedal 14 away from the base plate 110, and the two lamp reflectors 17 are respectively arranged on two sides of the front armrest 15 and can reflect light. There may be obstructions such as lawns, trees, and sand pits on a golf course. The lamp reflector 17 can help others quickly locate the golf cart through the reflective point even if the golf cart is partially blocked, especially when the players are scattered and the golf cart's driving route is not fixed, so as to reduce the safety hazards caused by blind spots.

It could be understood that under the guidance of the above embodiments, those skilled in the filed can combine various implementation methods in the above embodiments to obtain technical solutions of multiple implementation methods.

The above description is only a preferred embodiment of the present invention and is not to limit the present invention. Any modifications, equivalent substitutions and improvements made within the spirit and principles of the present invention should be included in the protection scope of the present invention.

The invention claimed is:

1. A foldable backseat, comprises a base plate and a turnover plate, wherein the turnover plate is movably connected to the base plate; with an external force, the turnover plate can be turned over to overlap with the base plate, or turned over to be at a same level as the base plate to form a storage platform-; a storage box is arranged below the base plate; a water outlet is arranged at a bottom end of the storage box; two side armrests are respectively perpendicularly arranged on two sides of the turnover plate; when the turnover plate is turned over to overlap with the base plate, the two side armrests are respectively vertically arranged on the two sides of the turnover plate; one side of the turnover plate is provided with anti-slip textures, and the other side of the turnover plate is provided with a soft cushion; a surface of the base plate is also provided with anti-slip textures; a plurality of fastening rings are arranged on the one side of the turnover plate with anti-slip textures and the surface of the base plate with anti-slip textures.

2. The foldable backseat according to claim 1, wherein the storage box is provided with an opening at a top side of the storage box; the opening is covered by a top cover plate; the top cover plate can be in a closed state or an open state.

3. The foldable backseat according to claim 1, wherein the foldable backseat also comprises a supporting frame; the base plate is fixed on the supporting frame, and the supporting frame is provided with a first mounting frame; the supporting frame can be fixedly installed on a rear end of the golf cart through the first mounting frame.

4. The foldable backseat according to claim 3, wherein a seat belt buckle is arranged on the supporting frame; the seat belt buckle is mounting to the base plate through a through hole; the seat belt buckle is exposed on the base plate.

5. The foldable backseat according to claim 1, wherein the foldable backseat also comprises a backrest which is arranged above the base plate; one side of the backrest is provided with a soft back cushion, and one side of the backrest is provided with a second mounting frame.

6. The foldable backseat according to claim 1, wherein the foldable backseat further comprises a pedal parallel to the base plate, and the pedal is connected to the base plate through a supporting column.

7. The foldable backseat according to claim 6, wherein a front armrest is arranged on one side of the pedal away from the base plate; one end of the turnover plate is used as a connection side to be connected with the base plate, and the other end of the turnover plate is used as a turnover side; a groove is arranged on the turnover side, and the groove can be clamped with the front armrest.

8. The foldable backseat according to claim 7, wherein a trailer tow ball is arranged at the bottom end of the front armrest.

* * * * *